(12) United States Patent
Pulice et al.

(10) Patent No.: US 9,650,087 B2
(45) Date of Patent: May 16, 2017

(54) SPARE TIRE ANTI-THEFT SECURITY DEVICE

(71) Applicants: Peter Pulice, Darien, IL (US); Eric Kowalik, Chicago, IL (US)

(72) Inventors: Peter Pulice, Darien, IL (US); Eric Kowalik, Chicago, IL (US)

(73) Assignee: Spare-tite, Inc., Darien, IL (US)

( * ) Notice: Subject to any disclaimer, the term of this patent is extended or adjusted under 35 U.S.C. 154(b) by 308 days.

(21) Appl. No.: 13/856,276

(22) Filed: Apr. 3, 2013

(65) Prior Publication Data
US 2013/0256344 A1 Oct. 3, 2013

Related U.S. Application Data

(60) Provisional application No. 61/619,653, filed on Apr. 3, 2012.

(51) Int. Cl.
| | | |
|---|---|---|
| *B62D 43/00* | (2006.01) | |
| *B60R 7/00* | (2006.01) | |
| *B62D 43/04* | (2006.01) | |
| *B60D 1/60* | (2006.01) | |

(52) U.S. Cl.
CPC ............ *B62D 43/007* (2013.01); *B60D 1/60* (2013.01); *B62D 43/045* (2013.01)

(58) Field of Classification Search
CPC .. B62D 43/045; B62D 43/007; Y10T 70/5987
USPC .............. 224/42.2, 42.25, 42.12, 42.26, 42.3
See application file for complete search history.

(56) References Cited

U.S. PATENT DOCUMENTS

| | | |
|---|---|---|
| 3,824,815 A | 7/1974 | Darling |
| 4,042,158 A | 8/1977 | Cole |
| 4,076,158 A | 2/1978 | Barr |
| 4,111,344 A | 9/1978 | MacDonald |
| 4,161,267 A | 7/1979 | Morrison |
| 4,225,066 A | 9/1980 | Barr |
| 4,282,995 A | 8/1981 | Austin |
| 4,294,088 A | 10/1981 | Barr |
| 4,308,733 A | 1/1982 | Tampa |
| 4,548,540 A * | 10/1985 | Renfro .......................... 414/463 |
| 4,751,833 A | 6/1988 | Stumpf, Jr. |
| 4,768,361 A | 9/1988 | Derman |
| 4,873,851 A | 10/1989 | Arnett |
| 4,878,366 A | 11/1989 | Cox |
| 4,884,785 A | 12/1989 | Denman et al. |
| 4,932,575 A | 6/1990 | Ware |
| 4,988,023 A | 1/1991 | Heathcoat |
| 5,077,995 A | 1/1992 | Appelbaum |

(Continued)

FOREIGN PATENT DOCUMENTS

| | | |
|---|---|---|
| FR | 2806056 | 9/2001 |
| GB | 2365395 | 2/2002 |

*Primary Examiner* — Derek Battisti
(74) *Attorney, Agent, or Firm* — Banner & Witcoff, Ltd.

(57) ABSTRACT

A novel and improved automobile spare tire anti-theft device and method is disclosed. In an embodiment, the spare tire anti-theft device can include a rigid arm member having a proximal end, an arm body, and a distal end. The proximal end can be configured to be removably secured to an automobile. The arm body is configured such that at least a portion of the arm body is positioned adjacent an exposed portion of a sidewall of a tire of a spare tire secured to the automobile when the proximal end is secured to the automobile.

16 Claims, 12 Drawing Sheets

(56) References Cited

U.S. PATENT DOCUMENTS

| | | | |
|---|---|---|---|
| 5,199,287 A | 4/1993 | McClary | |
| 5,303,569 A | 4/1994 | Wright | |
| 5,330,313 A | 7/1994 | Easterwood | |
| 5,343,722 A | 9/1994 | Richardson | |
| D351,986 S | 11/1994 | Schotthoefer | |
| 5,475,995 A | 12/1995 | Livingston | |
| 5,477,711 A | 12/1995 | Oliveri | |
| 5,487,288 A * | 1/1996 | Frantz | 70/259 |
| 5,582,048 A | 12/1996 | Schotthoefer | |
| 5,638,710 A | 6/1997 | Howard, Jr. et al. | |
| 5,638,711 A * | 6/1997 | Schotthoefer | 70/259 |
| 5,718,411 A | 2/1998 | Baughan et al. | |
| D395,221 S | 6/1998 | Ryan et al. | |
| 5,758,523 A | 6/1998 | Kozlowski, Jr. et al. | |
| 5,791,171 A | 8/1998 | Kelley | |
| 5,802,895 A | 9/1998 | Osgood | |
| 5,836,182 A | 11/1998 | Schotthoefer | |
| 5,924,314 A | 7/1999 | Cernansky | |
| 5,943,887 A | 8/1999 | Kozlowski, Jr. et al. | |
| 5,954,246 A | 9/1999 | Golovoy et al. | |
| 5,967,389 A * | 10/1999 | Hutter et al. | 224/42.21 |
| D421,707 S | 3/2000 | Gregory | |
| 6,092,790 A | 7/2000 | Dobmeier et al. | |
| 6,142,449 A | 11/2000 | Aldridge | |
| 6,164,100 A * | 12/2000 | Schotthoefer | 70/259 |
| 6,213,361 B1 * | 4/2001 | Dexel | 224/42.24 |
| 6,360,571 B1 | 3/2002 | O'Neal | |
| 6,370,927 B1 * | 4/2002 | Gonzalez et al. | 70/259 |
| 6,390,760 B1 | 5/2002 | Affer et al. | |
| 6,427,885 B1 | 8/2002 | Dexel | |
| 6,499,724 B1 | 12/2002 | Dobmeier | |
| 6,505,488 B1 | 1/2003 | Princell | |
| 6,527,252 B2 | 3/2003 | Dziedzic | |
| 6,554,253 B1 | 4/2003 | Dobmeier | |
| 6,561,489 B1 | 5/2003 | Wakefield | |
| 6,749,094 B1 | 6/2004 | Dexel | |
| 6,871,841 B2 * | 3/2005 | Brestelli et al. | 254/323 |
| 7,195,231 B2 | 3/2007 | Murphy | |
| 7,413,171 B2 | 8/2008 | Reznar | |
| 7,487,952 B2 | 2/2009 | Murphy | |
| 7,487,953 B2 | 2/2009 | Sauner | |
| 7,533,789 B1 * | 5/2009 | Seely et al. | 224/42.12 |
| 7,857,178 B2 * | 12/2010 | Brown, Jr. | 224/483 |
| 2004/0265102 A1 | 12/2004 | Reznar | |
| 2006/0013679 A1 | 1/2006 | Posani | |
| 2006/0045689 A1 | 3/2006 | Voegeli | |
| 2010/0186467 A1 | 7/2010 | Reidl | |

\* cited by examiner

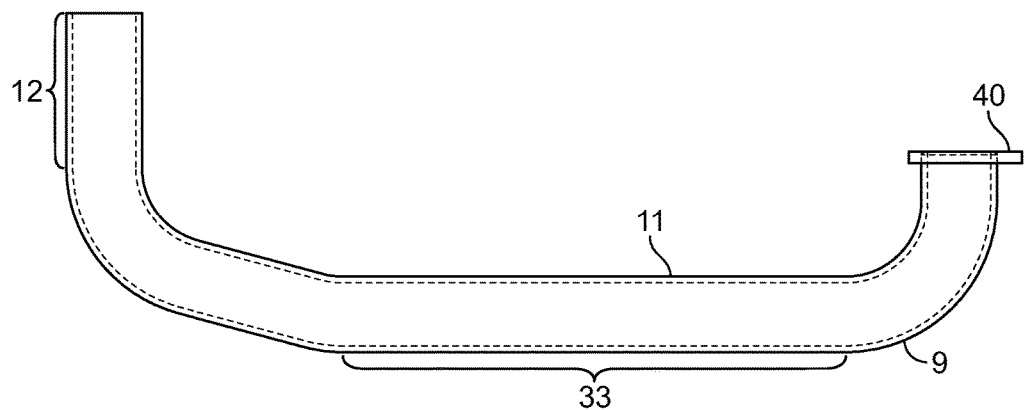
FIG. 5A
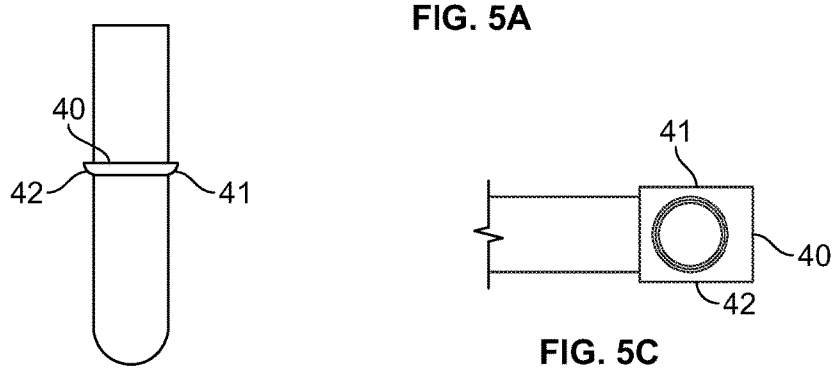
FIG. 5B
FIG. 5C
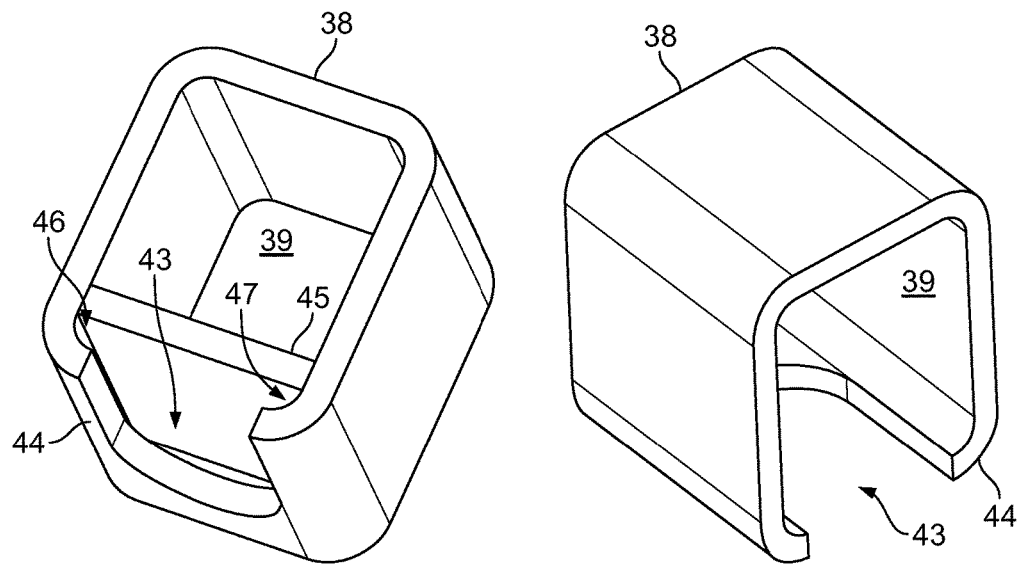
FIG. 6
FIG. 7

SPARE TIRE ANTI-THEFT SECURITY DEVICE

RELATED APPLICATION

This application claims the benefit of U.S. Provisional Application Ser. No. 61/619,653 filed on Apr. 3, 2012, which is incorporated by reference in its entirety.

BACKGROUND

There are numerous examples of spare tire anti-theft devices in the prior art. Many of these devices utilize a wide range of components to prevent the spare from being removed from the car by would-be thieves. Despite the use and availability of such devices, spare tire theft persists and, by many accounts, has increased.

Spare tires that are accessible from the exterior of the automobile are particularly susceptible to theft and are regularly targeted by thieves. There many types of systems used to secure spare tires to the exterior of the automobile. An example includes a cable and yoke system that secures the spare tire to the underside of the automobile carriage using a winch, cable, and yoke. When the tire is secured, the cable is often accessible through an opening in the rim of the tire. Thieves can insert cable cutters through the rim and sever the exposed portion of the cable, which thereby simultaneously separates the tire from the system and damages the system. Often times, the entire securement system needs to be replaced (winch, cable, and yoke). The vehicle owner typically incurs the cost of obtaining a new rim, tire, securement system, and labor associated with installation of each. Detrimentally, the owner typically does not notice the theft until the spare tire is needed in an emergency. In which case, the owner typically incurs the added cost of emergency service providers, such as towing.

Known devices and methods for preventing theft of spare tires lack in effectiveness, practicality, or both. For example, one inadequate solution is to chain the tire with a pad lock or combination lock to the underside of the carriage. Such a system is still susceptible to being breached by chain cutters. In addition, the locks are easily compromised by weather and other elements. Moisture, salt, and dirt can seize locks and bolts leaving the motorist unable to remove the spare tire during an emergency. Further, even if the lock is not compromised by the weather, the added inconvenience to the motorist for having to position themselves under the car to open the lock in darkness or inclement weather is undesirable.

There is a long felt need for an effective spare tire anti-theft system and method. The present disclosure details example embodiments a spare tire anti-theft system and method that offers both effective anti-theft protection and ease of access to the tire. There is also a long felt need to provide effective spare tire anti-theft protection, ease of access to the tire, and reliable access to the tire. The present disclosure describes example embodiments of a spare tire anti-theft system and method which provides effective spare tire anti-theft protection, ease of access to the tire, reliable access to the tire, in an uncomplicated and cost effective manner.

BRIEF DESCRIPTION OF THE DRAWINGS

The detailed description of example embodiments of the present disclosure will be made with reference to the accompanying drawings, wherein like designate corresponding parts in the several figures.

FIG. 5A depicts side view of an embodiment of a component of a spare tire anti-theft system.

FIG. 5B depicts a front view of FIG. 5A.

FIG. 5C depicts a partial top view of FIG. 5A.

FIG. 6 depicts a bottom perspective view of an embodiment of a component of a spare tire anti-theft system.

FIG. 7 depicts a top perspective view of an embodiment of a component of a spare tire anti-theft system.

DETAILED DESCRIPTION

Figure 1:
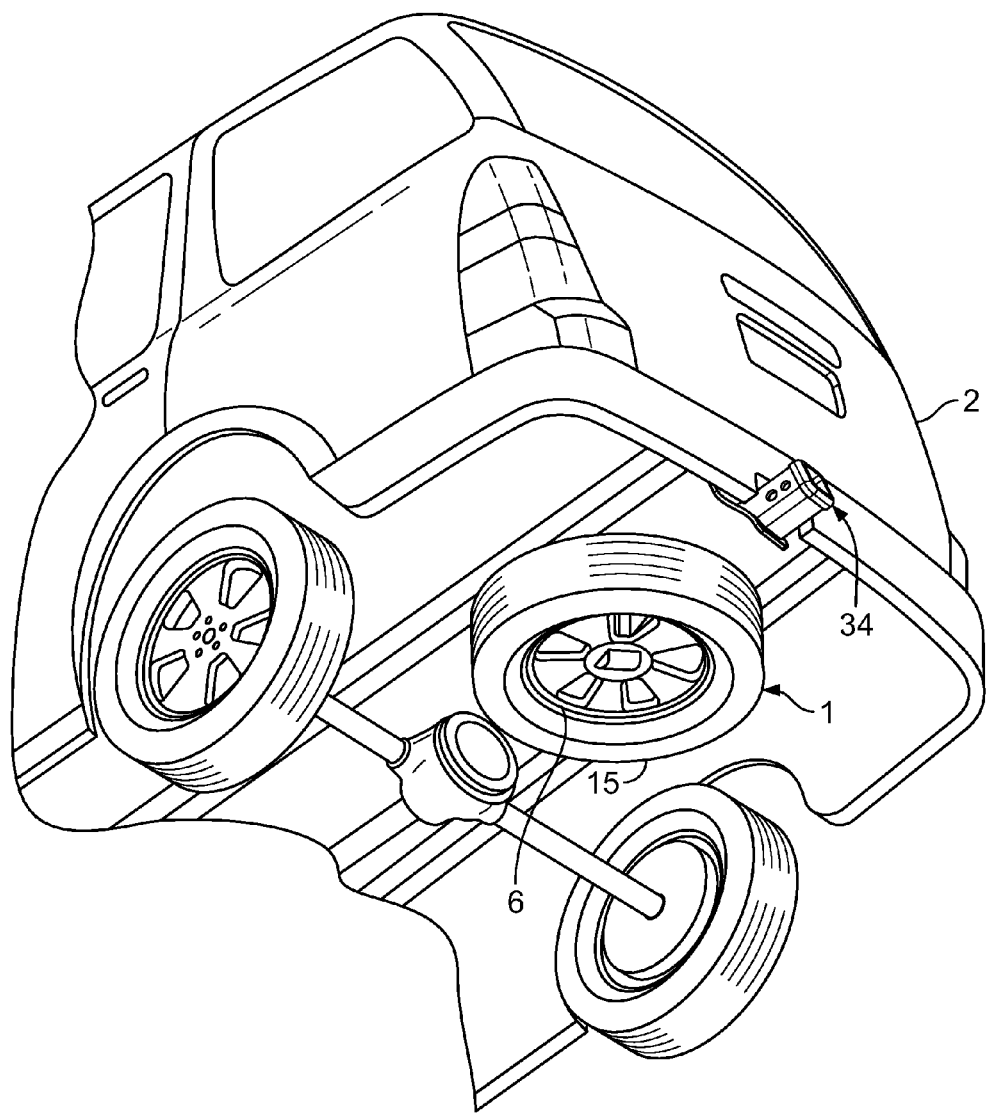
FIG. 1 depicts a bottom perspective view of the underside of a vehicle on which a spare tire is secured.

Referring to FIG. 1, example embodiments of a spare tire anti-theft system and spare tire anti-theft method described in the present disclosure are suitable for use, among other uses, to prevent theft of a spare tire secured to the underside of an automobile. An example system often used to secure a spare tire 1 to the underside of an automobile 2 includes a cable and yolk systems. Embodiments of the anti-theft system and method disclosed herein are also suitable for use to prevent theft of a spare tire secured to the underside of an automobile by systems other than a cable and yolk system.

Figure 2:
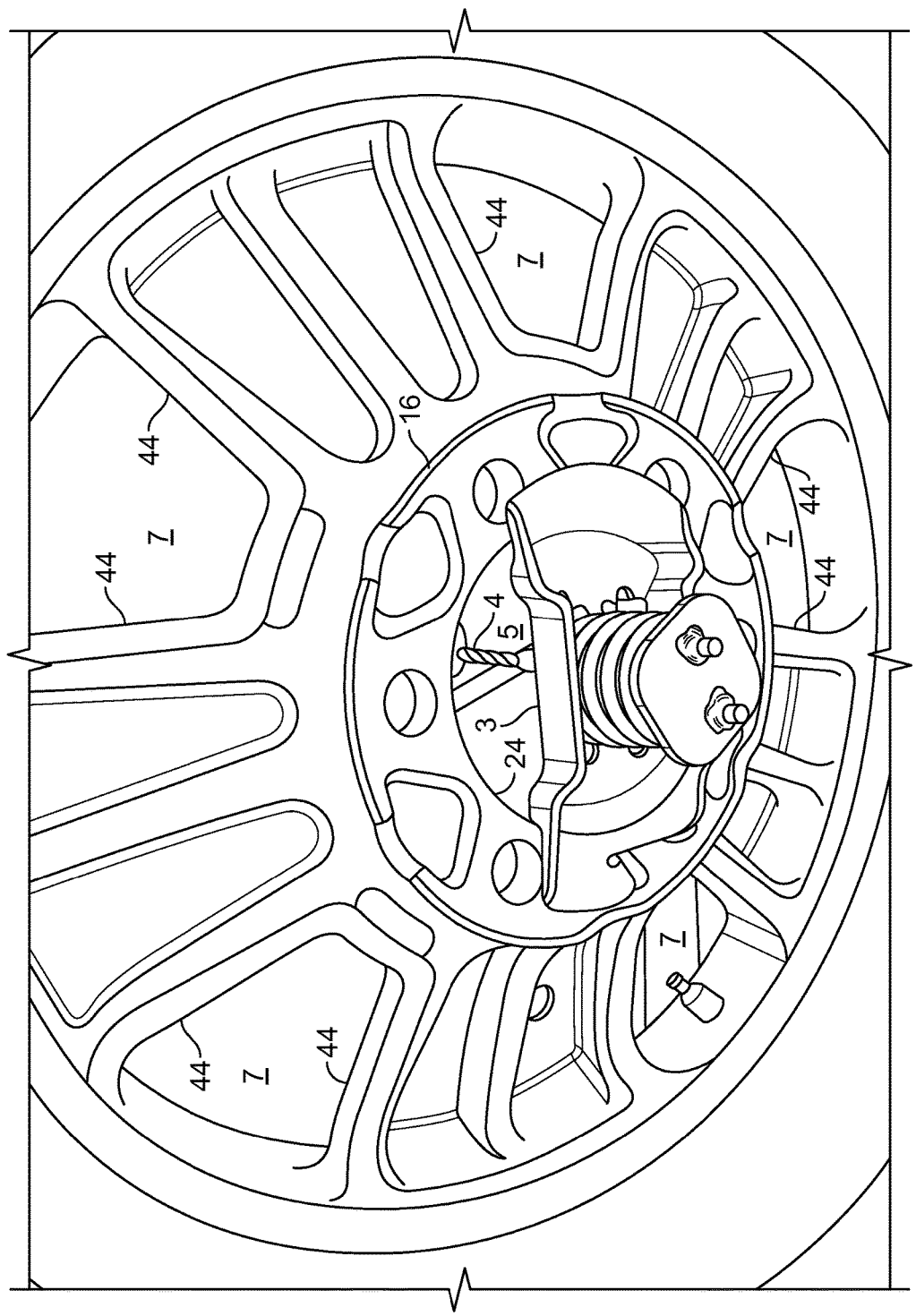
FIG. 2 depicts a bottom perspective view of a spare tire secured to the undercarriage of an automobile with a cable and yoke system.
Figure 3A:
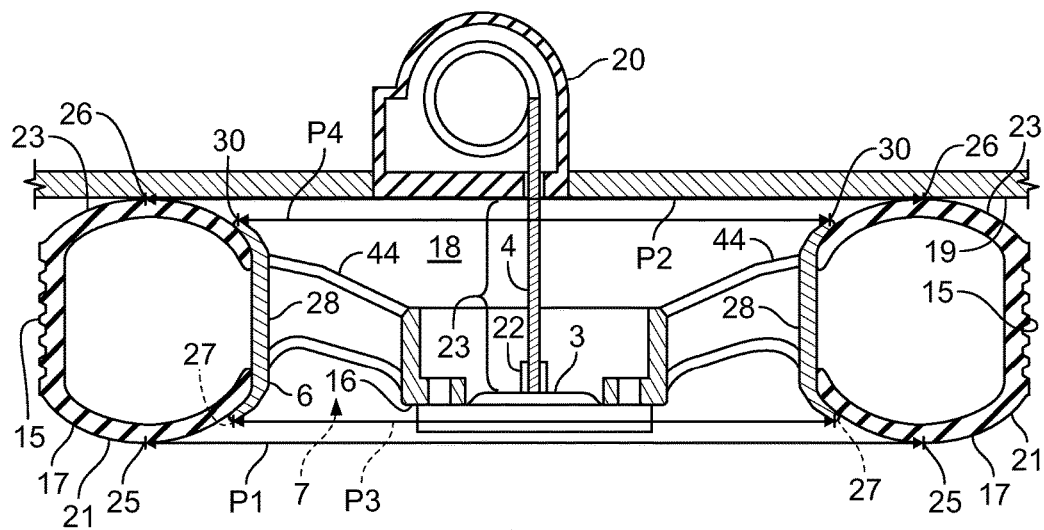
FIG. 3A depicts a cross-sectional side view of a spare tire secured to the undercarriage of an automobile with a cable and yoke system.
Figure 3B:
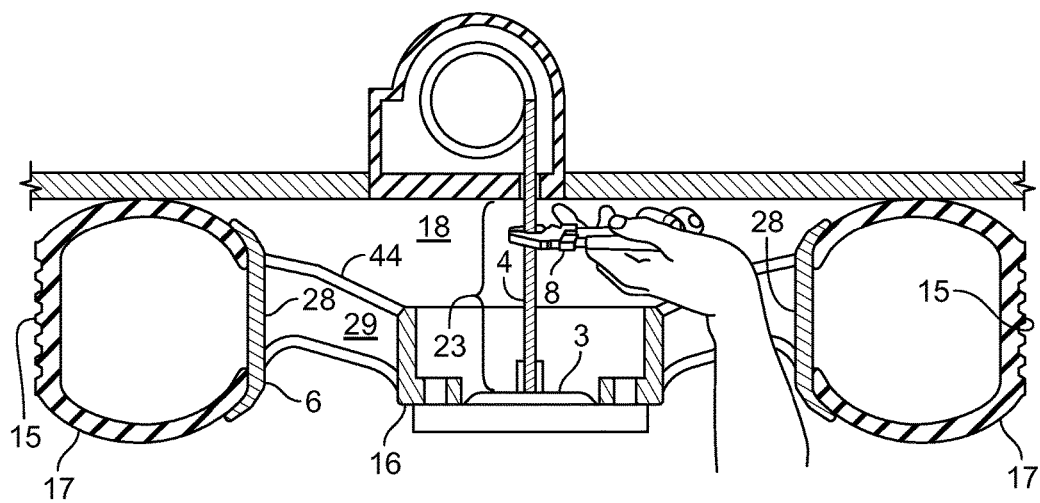
FIG. 3B depicts a cross-sectional side view of a spare tire secured to the undercarriage of an automobile with a cable and yoke system and further includes a depiction of how a would-be thief can gain access to the cable through the rim of the spare tire to sever the exposed portion of the cable with cutters.
Figure 4A:
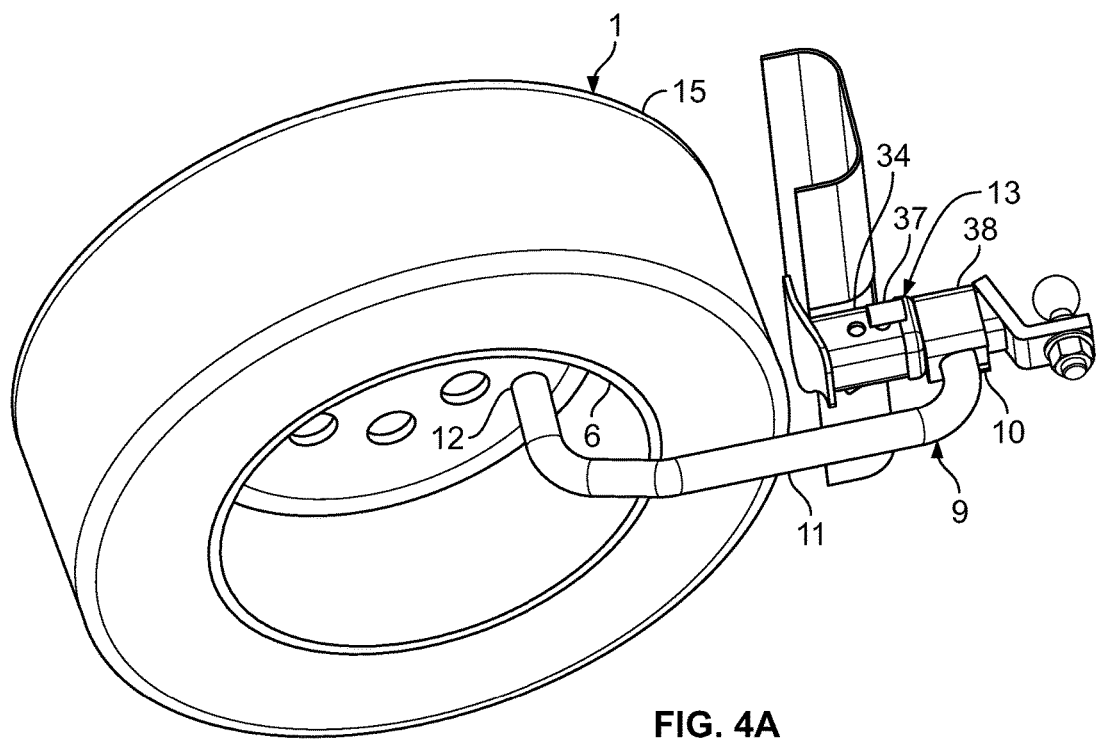
FIG. 4A depicts a bottom perspective view of an embodiment of a spare tire anti-theft system.
Figure 4B:
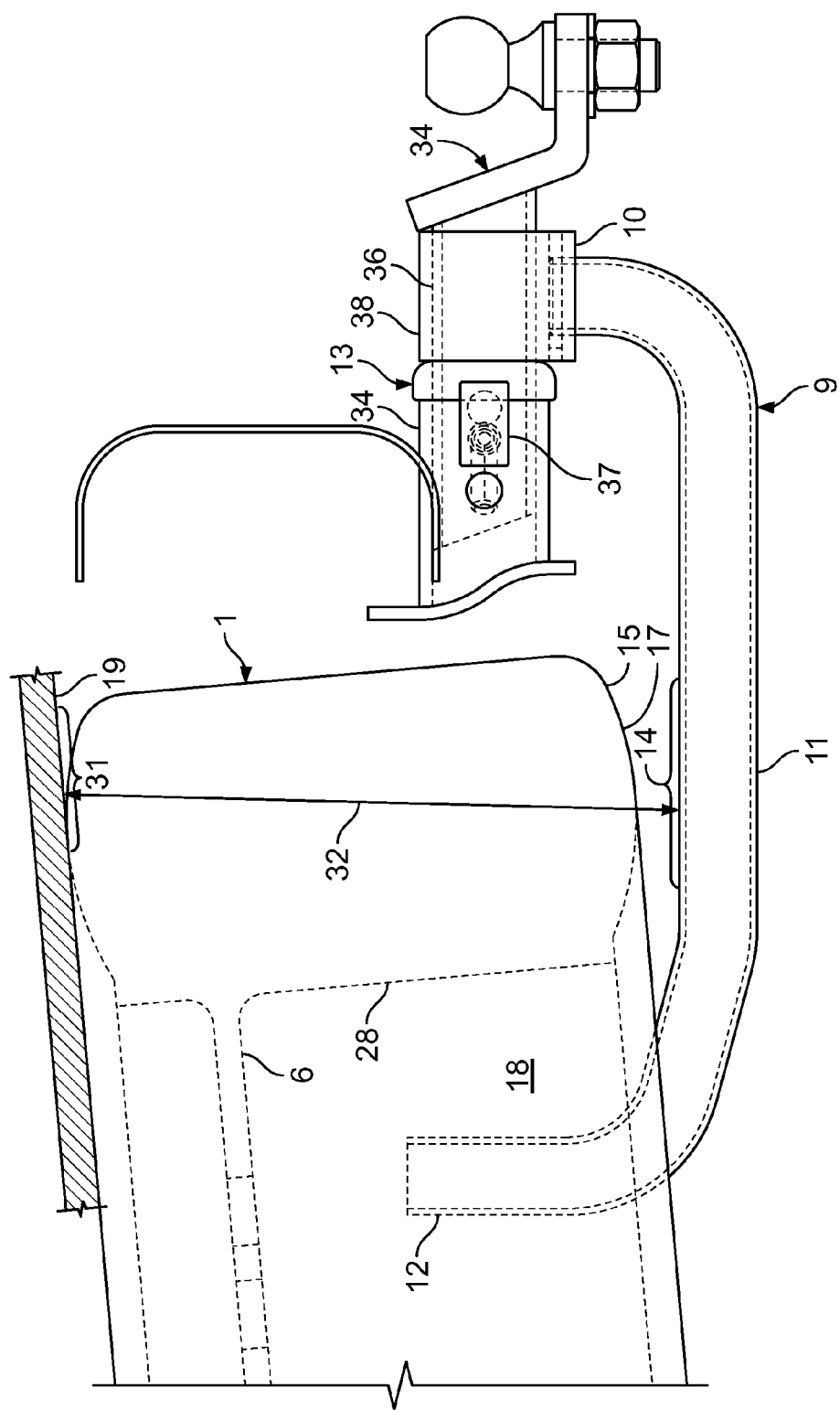
FIG. 4B depicts a side view of FIG. 4A.
Figure 8A:
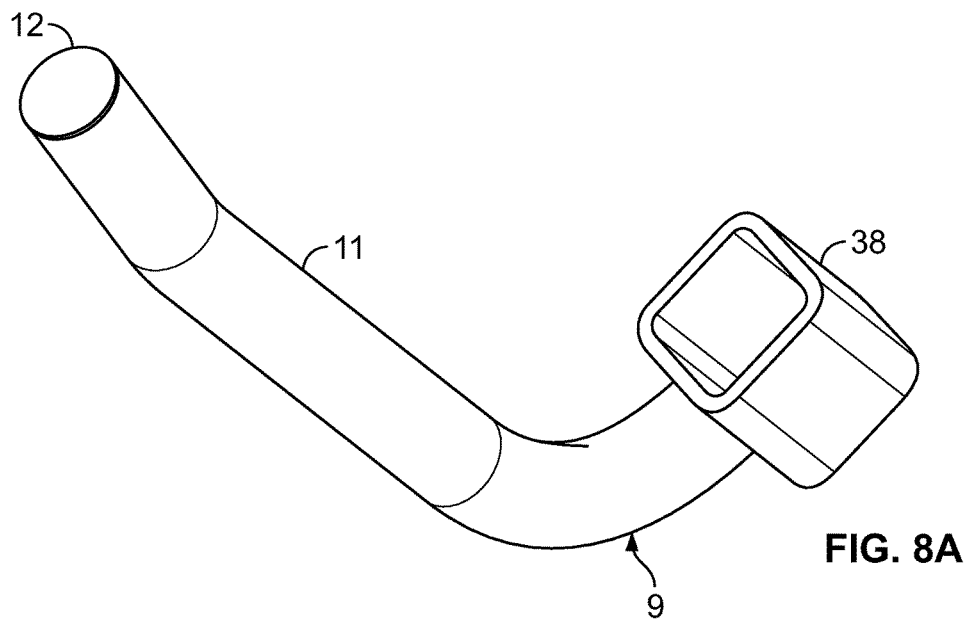
FIG. 8A depicts a top perspective view of an embodiment of a spare tire anti-theft system.
Figure 8B:
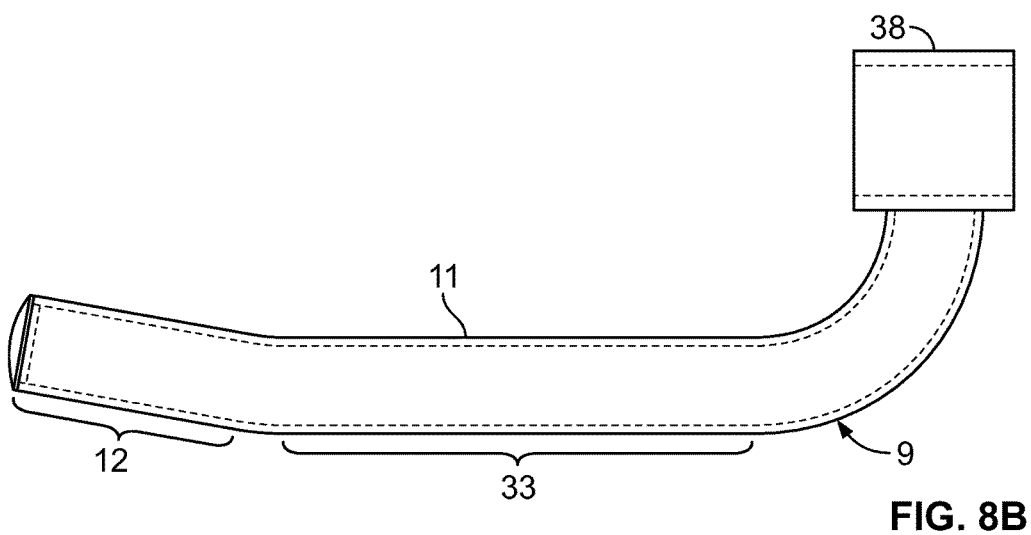
FIG. 8B depicts a side view of FIG. 8A.
Figure 8C:
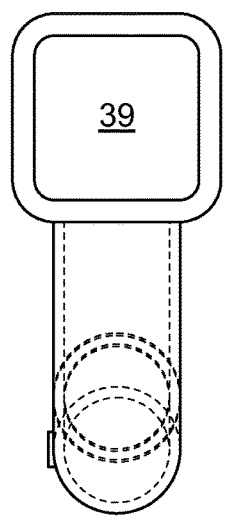
FIG. 8C depicts a front view of FIG. 8A.
Figure 9A:
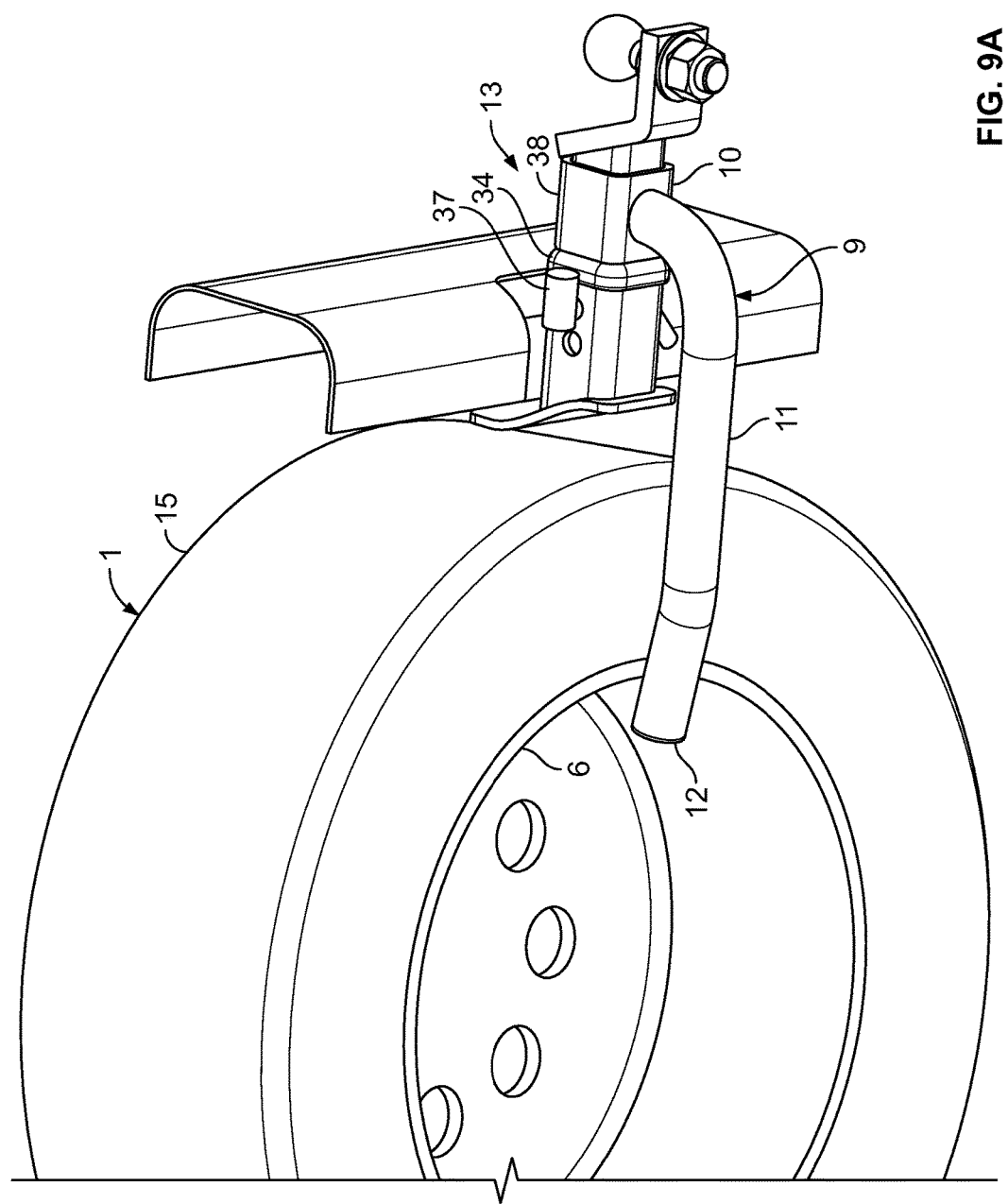
FIG. 9A depicts a bottom perspective view of an embodiment of a spare tire anti-theft system.
Figure 9B:
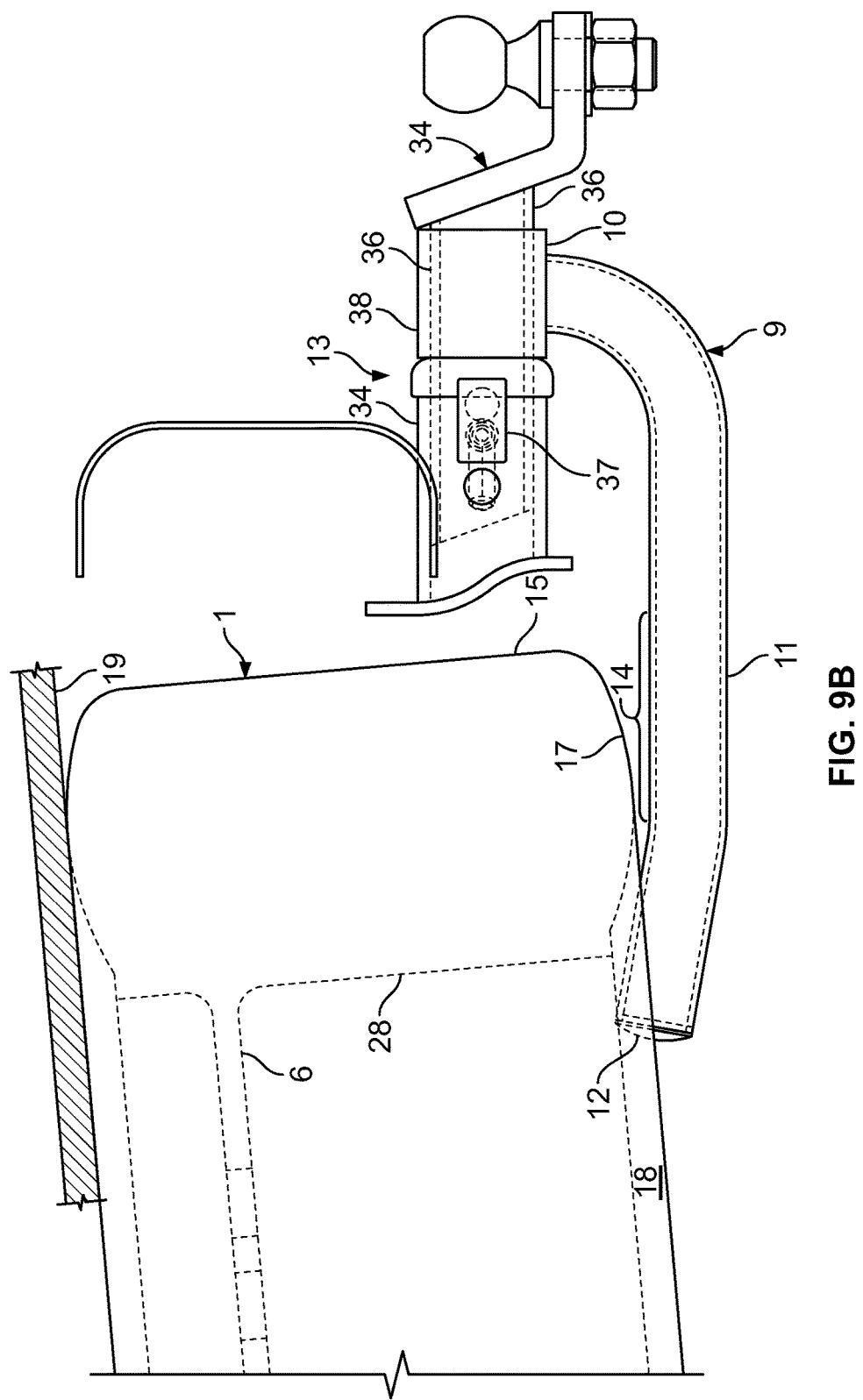
FIG. 9B depicts a side view of FIG. 9A.
Figure 10A:
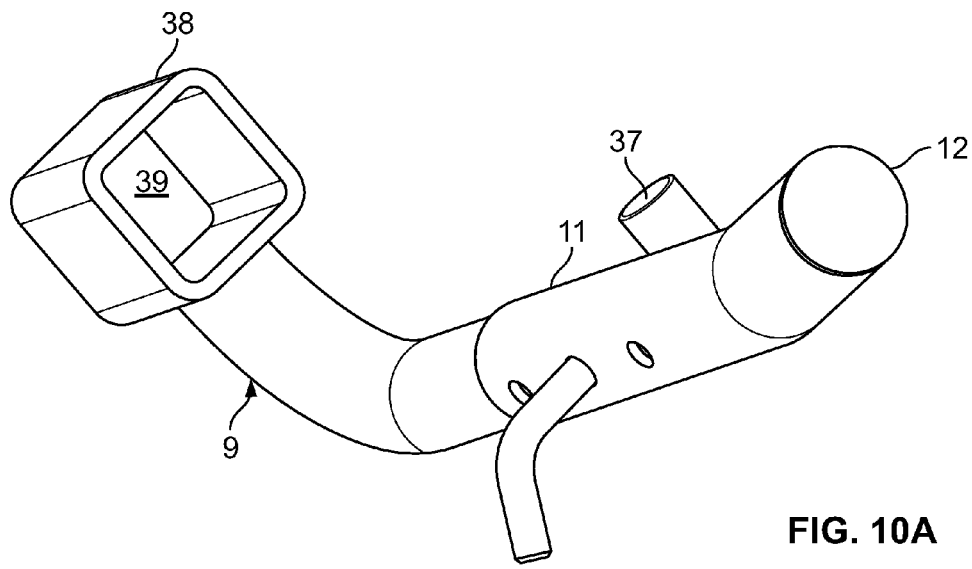
FIG. 10A depicts a top perspective view of an embodiment of a spare tire anti-theft system.
Figure 10B:
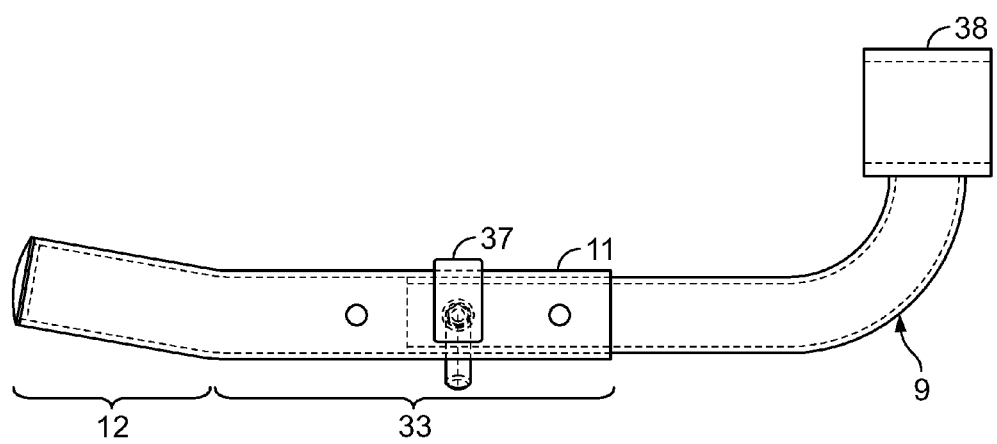
FIG. 10B depicts a side view of FIG. 10A.
Figure 10C:
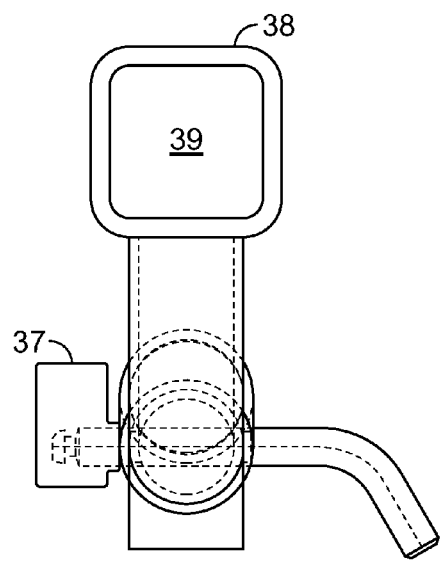
FIG. 10C depicts a front view of FIG. 10A.
Figure 11A:
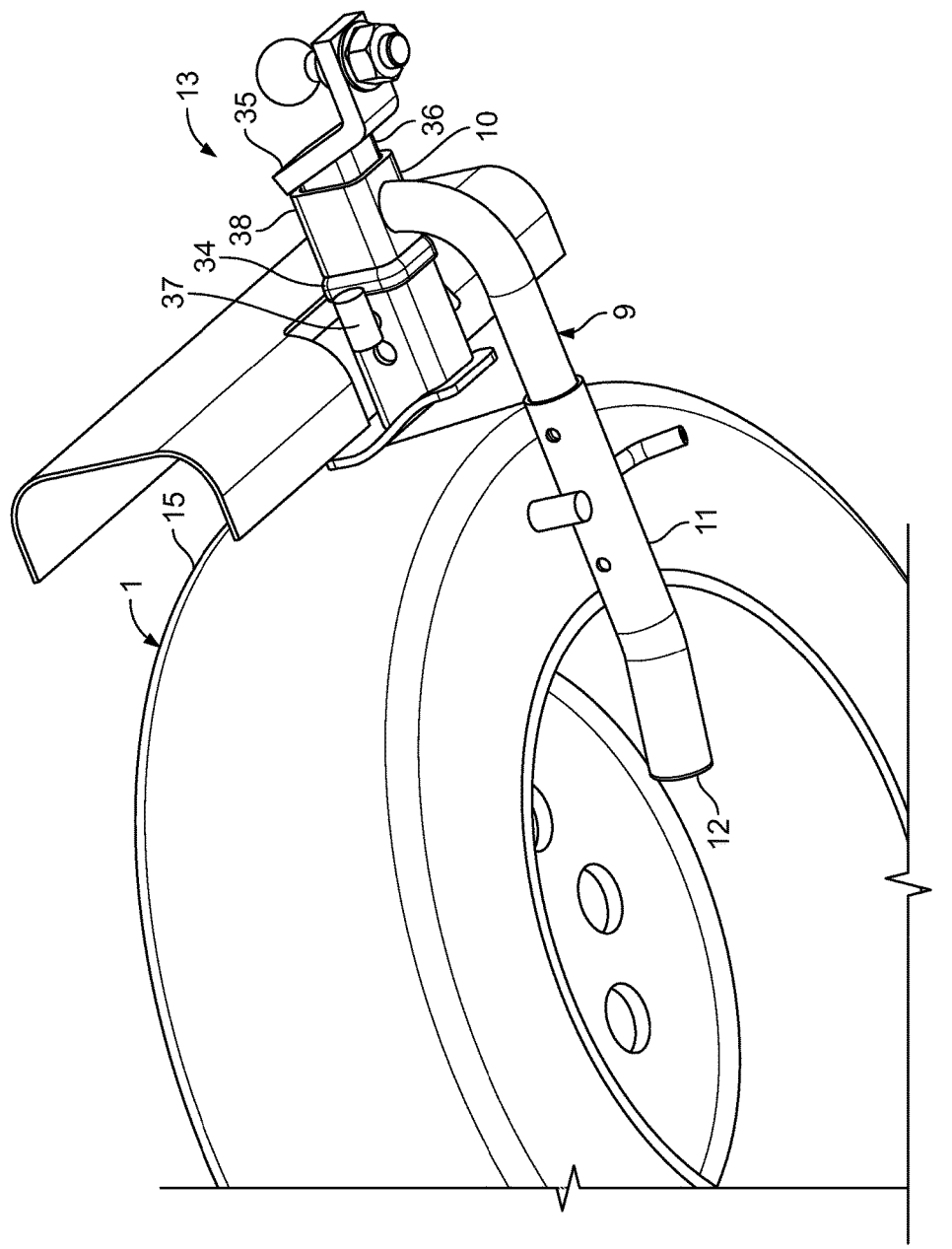
FIG. 11A depicts a bottom perspective view of an embodiment of a spare tire anti-theft system.
Figure 11B:
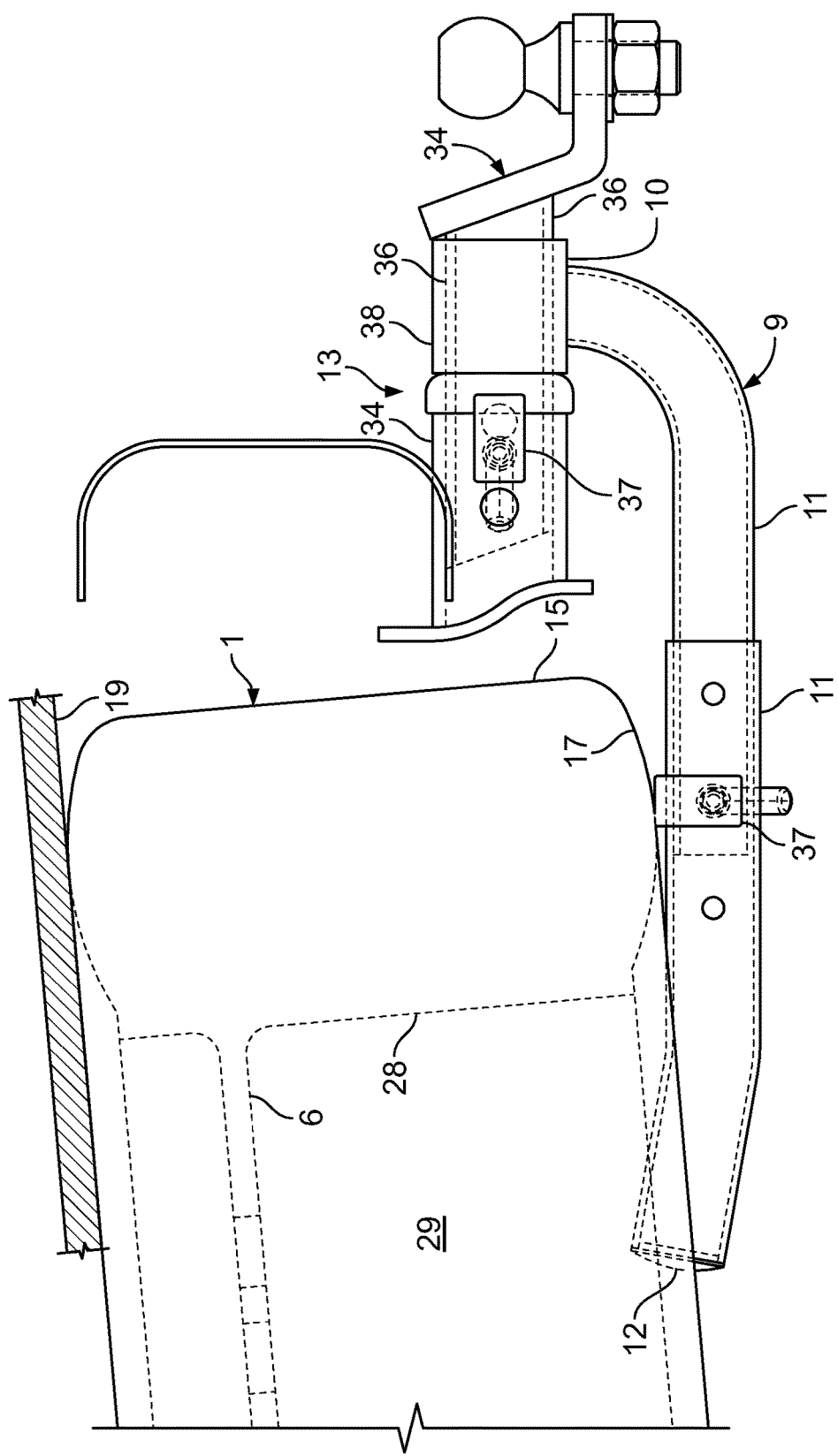
FIG. 11B depicts a side view of FIG. 11A.

Referring to FIGS. 2, 3A, and 3B, the spare tire 1 is secured to an underside surface 19 of a vehicle with a cable and yolk system. The spare tire 1 can include a tire 15 and rim 6. Significant components of cable and yoke systems include a winch system 20, a cable 4, and a yoke 3. Various types of winch systems are known in the art for extending or retracting the cable 4. The winch 20 can be secured to the undercarriage of the automobile and can be considered part of the undercarriage and form at least part of an underside surface 19 of the automobile. FIGS. 3A and 3B depict an example of the winch housing 20 forming part of the underside surface 19 of the automobile. The proximal end of the cable 4 is secured to the automobile at, for example, the winch 20. The yoke 3 is attached to the distal end of the cable 4. The distal end of the cable 4 often includes some type of cover or cap 22 to facilitate connecting the cable 4 to the yoke 3 and prevent the cable from fraying. For purposes of this disclosure, the cover or cap 22 can be considered part of the cable. A coupling system is often used to connect the cable 4 to the yoke 3. The coupling can utilize the aforementioned cover or cap and be part of the distal end of the cable, part of the yoke, or both. A variety of coupling structures and methods are used to connect the cable 4 to the yoke 3, including various clamps, crimping devices, locks, fittings, screws, bolts, and more.

To secure a spare tire to the underside surface 19 using a cable and yoke system, the cable is first drawn from the winch to extend the length of uncoiled cable and provide slack. Next, the yoke is inserted through the center bore of the hub 16 of the rim 6 of the spare tire 1 and positioned against the back side of the hub. The yoke and spare tire is drawn toward the underside of the automobile by, for example, cranking or winding the winch to draw the cable into the winch. The spare tire is secured against the underside surface 19 of the automobile by the tire or rim coming in contact with a portion of the underside surface 19 and the winch system holding the position of the cable taught to maintain such contact. Some systems use a chain in place of a cable 4 to perform the function of the cable.

Cable and yolk systems typically permit access to the cable 4 through multiple openings while the spare tire is secured to the underside of the automobile. For example, space between the yoke 3 and inside surface of the center bore 24 of the hub 16 of the rim 6 defines an opening 5 through which the cable 4 can be reached. In addition, spaces between spokes 44 of the rim 6 can provide openings 7 through which the cable 4 can be reached. Other openings through which the cable can be reached can be created by the various sizes and shapes of tires, rims, and the undercarriage, and the manner and orientation in which the tires and rims are secured to the undercarriage. For example, any space between the tire and the underside surface of the automobile can create such an opening.

Referring to FIG. 3B, a thief can reach the cable 4 with cutting device 8 through, for example, an opening 7 and use the cutting device 8 to sever the cable 4 and thereby release the spare tire 1 from the undercarriage. A thief can also reach the cable 4 with a cutting device through the opening 5 created by the space between the yoke 3 and the inside surface 24 of the center bore of the hub 16 of the rim 6. The length of cable susceptible to being severed as described above typically includes any portion of the cable that extends between the underside surface of the automobile and the yoke and can include portion of the cable that extends beyond the yolk. Such a portion or portions of the cable can be referred to as the exposed cable. An example of a length of exposed cable is identified with reference number 23 in FIG. 3A. The cutting device 8 can include any cutting device generally used in the art to cut cable, chains, and like sized metal components typically used in cable and yoke systems. However, in most circumstances, thieves are limited to cutting devices that can fit easily and quickly in the tight spaces above the rim and the space below underside of the automobile and the road, such devices often include compact jaws and handles. The smaller cutting devices are also preferred by thieves as being more easily concealable than their larger counterparts. The smaller cutting devices, however, reduce the thieves' capability of cutting through larger diameter pieces and harder pieces.

Referring to FIGS. 4A through 11B, multiple example embodiments of a spare tire anti-theft device and components thereof are shown. In an embodiment, the spare tire anti-theft device can include a rigid arm member 9 having a proximal end 10, an arm body 11, and a distal end 12. The arm body 11 can extend from the proximal end 10 to the distal end 12. The proximal end 10 can be spaced from the distal end 12. The proximal end 10 can be configured to be removably secured to an automobile. For example, as described below, the proximal end 10 can be configured to be removably secured to a tow hitch assembly 13 of an automobile. In an embodiment, the arm body 11 is configured such that at least a portion 14 of the arm body 11 is positioned adjacent an exposed portion of a sidewall 17 of a tire 15 of a spare tire 1 secured to the automobile 2 when the proximal end 10 is secured to the automobile 2. An exposed portion of a spare tire as used herein can include those portions which are readily accessible when the spare tire is secured. For example, as shown for example in FIGS. 1, 3A, and 4B, if a spare tire 1 is secured to the underside surface 19 of an automobile 2, and the outer sidewall 23 of the tire 15 of the spare tire 1 is in contact with the underside surface 19 of the automobile, and the inner sidewall 21 of the tire 15 faces toward and is exposed to the ground, the inner sidewall 21 of the tire is considered exposed. In an embodiment, positioning a portion 14 of the arm body 11 adjacent an exposed portion of a sidewall 17 when the proximal end 10 is secured to the automobile can prevent a thief stealing the spare tire 1 even if the thief severs the cable 4 to release the tire. For example, in an embodiment, the arm body 11 can be positioned such that the spare tire 1 cannot be oriented in a manner which would permit the spare tire to be removed from the underside of the automobile even if the cable 4 is severed. For example, other structures on the underside of the automobile may prevent the spare tire from moving in any direction but downward. Therefore, in such example, when a portion of the rigid arm member 9 is positioned adjacent a portion of an exposed sidewall of a tire of spare tire, the rigid arm member 9 can prevent the spare tire 1 from being moved enough distance in the downward direction to permit the spare tire from being removed from the underside of a vehicle and thereby prevent a thief from stealing the spare tire.

In an embodiment, the arm body 11 is configured such that at least a portion of the distal end 12 is positioned within the interior cavity 18 of the spare tire 1 when the proximal end 10 is secured to the automobile. As used herein, the interior cavity 18 of the spare tire includes the interior open space between inner radial plane P1 and outer radial plane P2 of the spare tire, wherein the inner radial plane P1 is a first plane extending in the radial direction between outermost extremities 25 of an inner side 21 of the tire 15, and wherein the outer radial plane is a second plane extending in the radial direction between outermost extremities 26 of an outer side 23 of the tire 15. Within the interior cavity 18 of the spare tire 1 is the interior barrel cavity 29 of the spare tire 1. As used herein, the interior barrel cavity 29 of the spare tire 1 includes the interior open space in the barrel 28 of the rim 6. The interior open space in the barrel 28 of the rim 6 can be between the inner radial plane P3 of the rim 6 and the outer radial plane P4 of the rim 6, where the inner radial plane P3 is a third plane extending in the radial direction between outermost interior edges 27 of the rim 6, and wherein the outer radial plane P4 is a fourth plane extending in the radial direction between outermost exterior edges 30 of the rim 6. In an embodiment, having the distal end 12 of the rigid arm member 9 positioned within the interior barrel cavity adds an additional element of theft protection because it reduces the chances that the spare tire can be oriented in a manner in which it can be removed from the underside of the vehicle if, for example, the cable is severed.

In an embodiment, the arm body 11 is configured such that a distance 32 between the portion 14 of the arm body 11 positioned adjacent an exposed portion of a sidewall 17 and a portion 31 of the surface of the automobile opposing the portion 14 is greater than a width of the tire 15. This permits at least a portion of the tire 15 to fit between the portion 14 of the arm body 11 and the portion 31 of the surface of the automobile. In an embodiment, the arm body 11 is configured such that a distance between the distal end 12 and the surface of the automobile opposing the distal end is less than width of the tire 15. This allows the tire to fit between the portion 14 of the arm body and its opposing portion 31 of the surface of the automobile but prevents the spare tire 1 from being removed in a direction toward the distal end 12 or in a direction toward the portion 14 of the arm body.

In an embodiment, the arm body 11 includes a lateral segment 33. In an embodiment, the lateral segment can, but need not, include the aforementioned portion 14 of the arm body. In an embodiment, the distal end is oriented at an angle relative to the lateral segment. In an embodiment, the angle can be between about 10 to about 145 degrees. The term about as used herein in referenced to dimensions or angles means plus or minus 25% of the stated value. In an embodiment, the distal end is transvers to the lateral segment. In an embodiment, the portion 14 of the arm body 11 positioned adjacent the exposed portion of a sidewall 17 can be positioned less than about 6 inches from the exposed portion of sidewall. In an embodiment, the portion 14 of the arm body 11 positioned adjacent the exposed portion of a sidewall 17 can be positioned in contact with exposed portion of a sidewall 17.

In an embodiment, the proximal end 10 is configured to be secured to a tow hitch assembly 13 of the automobile 2. A tow hitch assembly can include a hitch receiver 34 and removable mount 35. The receiver 34 and removable mount 35 can take many forms known in the art. For example, the receiver 34 can be a receiver-type, including receiver-types with square receiver openings, fixed-drawbar type, or pintle hook. For example, the removable mount 35 can be a tow ball, flat cap, or lunette ring. The removable mount 35 can be secured to the hitch receiver according to various methods known in the art. In an embodiment, the removable mount 35 includes a tongue 36 configured to slidably mate with the hitch receiver 34 and be removably secured to the hitch receiver 34. For example, in an embodiment, a locking pin 37 can be used to secure the removable mount 35 to the receiver 34. For example, the locking pin 37 slides through complimentary holes in the sides of the receiver 34 and removable mount 35 to secure the removable mount 35 to the receiver when the respective holes are aligned and the locking pin 37 is positioned in place. When secured, the locking pin 37 prevents the removable mount 35 from being removed from the receiver 34.

In an embodiment, a hitch coupling 38 is secured to the proximal end 10 of the rigid arm member 9 to connect the rigid arm member 9 to a tow hitch assembly. In an embodiment, the hitch coupling 38 has an internal passage 39 configured to receive a tongue 36 of a removable mount 35 therethrough. The internal passage 39 is complimentary with the exterior shape of the tongue 36 so that the hitch coupling can slidably mate with the tongue 36 of the removable mount 35.

In an embodiment, a flange 40 is secured to the proximal end 10 of the rigid arm member 9. The flange 40 can include a first lateral side 41 and a second lateral side 42. In an embodiment, a slot 43 can be defined in a bottom wall of the hitch coupling 38. The slot 43 can be configured to receive at least a portion of the proximal end 10. For example, if the proximal end 10 is cylindrical in shape, the slot 43 can be defined to receive a proximal end 10 of cylindrical shape. In an embodiment, the flange 40 is configured to be received within the internal passage 39 of the hitch coupling 38. For example, in an embodiment, the flange has a greater width defined between the first lateral side 41 and the second lateral side 42 than the width of the slot 43. In the example embodiment shown in FIG. 7, the proximal end 10 of a rigid arm member 9 with a flange 40 can be slid into the slot 43 of a hitch coupling 38 so that the proximal end 10 is received in the slot 43 and the flange 40 is received in the internal passage 39 and the flange 40 is placed in contact with the bottom wall 44 of the hitch coupling 38. A tongue 36 of a removable mount 35 can then be slid into and through the internal passage 39 and then into the hitch receiver 34 and positioned so that the rear of the hitch coupling 38 is pressed against the receiver and the front of the hitch coupling is pressed against the removable mount so that the rigid arm member 9 is prevented from being removed from the slot. The tongue 36 can then be locked in place with locking pin 37 to secure both the removable mount 35 to the hitch receiver 34 and secure the rigid arm member 9 to the tow hitch assembly 13. The locking pin 37 would then have to be unlocked and the tongue 36 pulled out from the receiver to provide enough space for the rigid arm member 9 to be removed from the hitch coupling 38.

In an embodiment shown in FIG. 6, a flange securement wall 45 is positioned in the hitch coupling 38 proximate the bottom wall 44 so that a first flange channel 46 and a second flange channel 47 are defined between the bottom wall 44 and the flange securement wall 45. In an embodiment, the first and second flange channels are configured to receive the first lateral side 41 and the second lateral side 42 of the flange 41. In an embodiment, a hitch coupling 38 with flange securement wall 45 can be used in a similar manner as explained above relative to FIG. 7 except that the flange 41 is slid into the hitch coupling 38 so that the lateral sides are positioned in the flange channels. Such configuration can reduce instances of improper fit between the hitch coupling, rigid arm member, and tongue.

In an embodiment, the tongue 36 and hitch coupling 38 are comprised of square tubing, each having top, bottom, left, and right sidewalls. In an embodiment, the device is constructed of at least one of steel, aluminum, rigid plastic, and carbon fiber. In an embodiment, the arm body 11 is between about 0.50 to about 2.50 inches thick. In an embodiment, the arm body 11 is of adjustable length. In an embodiment, as shown in FIGS. 10A through 11B, the arm body 11 can consist of concentric tubing with complimentary holes positioned along the length of the tubing so that a locking pin 37 can set the arm body at multiple lengths.

The device of the instant disclosure overcomes the disadvantages of the prior art and accomplishes the surprising result of a combination of effective anti-theft protection, theft deterrent, ease of access to the spare tire, reliable access to the spare tire, in an uncomplicated and cost effective manner. The anti-theft effectiveness of the current device exhibited by that, for example, a great majority of the cutting devices used to sever cables of cable and yoke systems are rendered useless for such purpose as cutting the cable and yoke system would not result in the release of the tire and that such cutting devices cannot cut through the rigid arm body of the instant disclosure at all or at least without undue difficulty. The device of the instant disclosure provides effective anti-theft protection while providing ease of access to the spare tire. The device provides effective anti-theft protection and reliable access to the spare as, for example, the device is generally unaffected by the elements. The device provides effective anti-theft protection in an easy to use, cost-effective manner in that, for example, the device can consist of one piece or several easily assemble pieces. The combination of anti-theft effectiveness and the aforementioned advantages are surprising and, in addition, solve a long-felt need for a solution where many others have failed to achieve such combination.

The reader should understand that these specific examples are set forth merely to illustrate examples of the device, and they should not be construed as limiting. Many variations may be made from the specific structures described above without departing from this disclosure.

What is claimed is:

1. An automobile spare tire anti-theft device comprising:
   a rigid arm member comprising a proximal end, an arm body, and a distal end;
   the arm body extends from the proximal end to the distal end; and
   the proximal end is spaced from the distal end;
   wherein the proximal end is configured to be removably secured to a tow hitch assembly of an automobile and wherein the distal end is not secured to the spare tire;
   wherein the rigid arm member is configured such that at least a lateral segment of the arm body is positioned adjacent to and opposing an exposed sidewall of a tire of a spare tire secured to the underside of the automobile when the proximal end of the rigid arm member is secured to the tow hitch assembly of the automobile, wherein the lateral segment is between the proximal end and the distal end of the rigid arm member and the lateral segment is oriented substantially parallel with a hitch receiver of the tow hitch assembly of the automobile, wherein the exposed sidewall of the tire is exposed toward the ground;
   wherein the rigid arm member is configured such that at least a portion of the distal end is positioned within an interior cavity of the spare tire when the proximal end is secured to the automobile; and
   wherein the arm body is configured such that a first distance is defined between the lateral segment and an underside surface of the automobile opposing the lateral segment, the first distance being greater than a width of the tire such that at least a portion of the spare tire can fit between the lateral segment and the surface of the automobile.

2. The device of claim 1 wherein the distal end is oriented at a first angle transverse to the lateral segment.

3. The device of claim 2 wherein the first angle is between about 10 to about 145 degrees.

4. The device of claim 2 wherein the distal end is within the interior barrel cavity of the spare tire, wherein the interior barrel cavity of the spare tire is defined as interior open space between inner and outer radial planes of a rim of the spare tire, wherein the inner radial plane is a third plane extending in the radial direction between outermost interior edges of the rim, and wherein the outer radial plane is a fourth plane extending in the radial direction between outermost exterior edges of the rim.

5. The device of claim 2 wherein the lateral segment is configured to be positioned less than about 6 inches from the exposed sidewall.

6. The device of claim 1 wherein the tow hitch assembly includes the hitch receiver, a removable mount, and a hitch coupling, the removable mount having a tongue configured to slidably mate with the hitch receiver and be removably secured to the hitch receiver, wherein a hitch coupling secured to the proximal end of the arm body to connect the proximal end to the tow hitch assembly, the hitch coupling has an internal passage configured to receive the tongue of the removable mount therethrough such that the hitch coupling is configured to slidably mate with the tongue of the removable mount.

7. The device of claim 6, further comprising a flange secured to the proximal end of the arm body and a slot defined in a bottom wall of the hitch coupling, wherein the slot is configured to receive at least a portion of the proximal end and the flange is configured to be received within the internal passage of the hitch coupling and wherein the flange has a greater width than a width of the slot.

8. The device of claim 7, further comprising a flange securement wall positioned in the hitch coupling proximate the bottom wall such that a first flange channel and a second flange channel are defined between the bottom wall and the flange securement wall, wherein the first and second channels are configured to receive a first lateral side and second lateral side of the flange.

9. The device of claim 8 wherein the tongue and hitch coupling are comprised of square steel or aluminum tubing.

10. The device of claim 9 wherein the tongue and hitch coupling are comprised of square tubing.

11. The device of claim 1 further comprising a hitch coupling secured to the proximal end of the arm body to connect the proximal end to the tow hitch assembly of the automobile, wherein the hitch coupling has an internal passage configured to receive a portion of the tow hitch assembly therethrough.

12. The device of claim 1 wherein the device is constructed of at least one of steel, aluminum, rigid plastic, and carbon fiber.

13. The device of claim 1 wherein the arm body is between about 0.50 to about 2.50 inches in thickness.

14. The device of claim 1 wherein the arm body is configured to be of adjustable length.

15. A spare tire anti-theft assembly for an automobile comprising:
   a rigid arm member comprising a proximal end, an arm body, and a distal end;
   the arm body extends from the proximal end to the distal end;
   the proximal end is spaced from the distal end;
   a hitch coupling secured to the proximal end of the rigid arm member, wherein the hitch coupling has an internal passage configured to receive a portion of a tow hitch assembly of an automobile therethrough, and wherein the distal end is not secured to the spare tire;
   the hitch coupling is removably secured to the tow hitch assembly of the automobile such that a lateral segment of the arm body is positioned adjacent to and opposing an exposed sidewall of the spare tire secured to the underside of the automobile, wherein the lateral segment is between the proximal end and the distal end of the rigid arm member and the lateral segment is oriented substantially parallel with a hitch receiver of the tow hitch assembly of the automobile, wherein the exposed sidewall of the tire is exposed toward the ground;
   wherein the arm body is configured such that a first distance is defined between the lateral segment and an underside surface of the automobile opposing the lateral segment, the first distance being greater than a width of the tire such that at least a portion of the spare tire can fit between the lateral segment and the surface of the automobile; and wherein the rigid arm member is configured such that at least a portion of the distal end is positioned within an interior cavity of the spare tire when the proximal end is secured to the automobile.

16. The device of claim 15 wherein at least a portion of the distal end is positioned within an interior cavity of the spare tire, wherein the interior cavity of the spare tire is defined as interior open space between inner and outer radial planes of the spare tire, wherein the inner radial plane is a first plane extending in the radial direction between outermost extremities of an inner side of the tire, and wherein the outer radial plane is a second plane extending in the radial direction between outermost extremities of an outer side of the tire.

* * * * *